United States Patent
Peucat et al.

(10) Patent No.: US 9,222,849 B2
(45) Date of Patent: Dec. 29, 2015

(54) METHOD FOR MONITORING AN SCR SYSTEM

(75) Inventors: Frederic Peucat, Brussels (BE); Jean-Claude Habumuremyi, Haaltert (BE); Joel Op de Beeck, Lint (BE)

(73) Assignee: INERGY AUTOMOTIVE SYSTEMS RESEARCH (Société Anonyme), Brussels (BE)

( * ) Notice: Subject to any disclaimer, the term of this patent is extended or adjusted under 35 U.S.C. 154(b) by 378 days.

(21) Appl. No.: 13/805,871

(22) PCT Filed: Jun. 22, 2011

(86) PCT No.: PCT/EP2011/060468
§ 371 (c)(1),
(2), (4) Date: Apr. 4, 2013

(87) PCT Pub. No.: WO2011/161175
PCT Pub. Date: Dec. 29, 2011

(65) Prior Publication Data
US 2013/0180323 A1    Jul. 18, 2013

(30) Foreign Application Priority Data

Jun. 23, 2010   (FR) ...................................... 10 54986

(51) Int. Cl.
*G01M 15/09* (2006.01)
*G01M 3/02* (2006.01)
*F01N 3/20* (2006.01)
(Continued)

(52) U.S. Cl.
CPC ............. *G01M 3/025* (2013.01); *F01N 3/2066* (2013.01); *F01N 11/00* (2013.01); *G01M 15/09* (2013.01); *G01M 15/102* (2013.01); *F01N 2550/05* (2013.01); *F01N 2610/14* (2013.01);
(Continued)

(58) Field of Classification Search
CPC ....................................................... G01M 3/025
See application file for complete search history.

(56) References Cited

U.S. PATENT DOCUMENTS

2005/0287034 A1* 12/2005 Wills et al. ..................... 422/52
2006/0196170 A1   9/2006 Henning et al.
(Continued)

FOREIGN PATENT DOCUMENTS

| DE | 10 2005 009 464 | 9/2006 |
|---|---|---|
| DE | 10 2008 043 469 | 5/2010 |
| WO | 2005 061866 | 7/2005 |

OTHER PUBLICATIONS

U.S. Appl. No. 13/806,407, filed Dec. 21, 2012, Peucat, et al.
(Continued)

*Primary Examiner* — Paul West
(74) *Attorney, Agent, or Firm* — Oblon, McClelland, Maier & Neustadt, L.L.P.

(57) ABSTRACT

A method for detecting whether an injector with a valve controlled by a PWM signal of an SCR system is clogged, the SCR system including a rotary positive-displacement pump driven by a motor and pressure of which is controlled by a controller that continuously measures rotational speed of the motor and pressure at an outlet of the pump. During operation of the SCR system at a given pressure: the associated average rotational speed is measured; the speed is held at the measured value; a curve of a change in pressure is compared to reference curves stored in a memory and a condition of the injector, for example whether the injector is clogged or not, is deduced therefrom.

10 Claims, 2 Drawing Sheets

Figure 1:
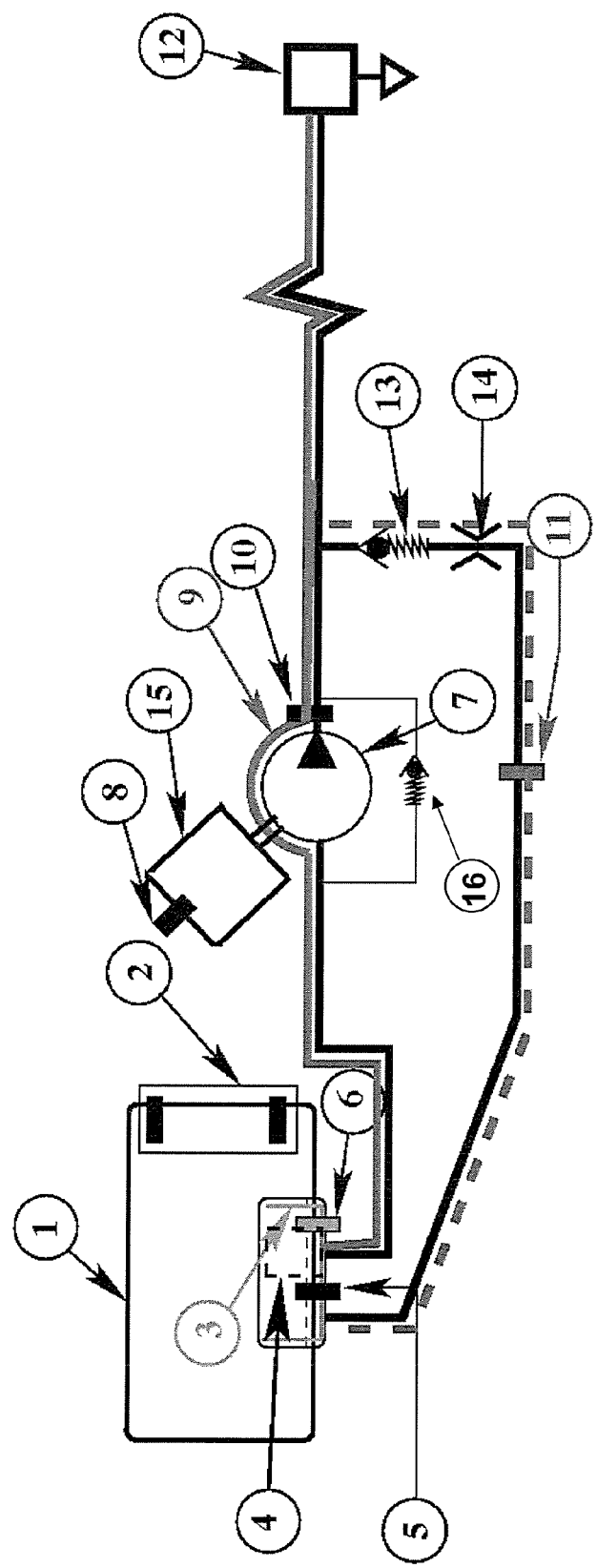

(51) Int. Cl.
*F01N 11/00* (2006.01)
*G01M 15/10* (2006.01)
(52) U.S. Cl.
CPC .......... *F01N2610/1433* (2013.01); *Y02T 10/24* (2013.01); *Y02T 10/47* (2013.01)

(56) References Cited

U.S. PATENT DOCUMENTS

2009/0101338 A1* 4/2009 Flanders .................. 166/250.01

2009/0159132 A1 6/2009 Gerlach
2009/0248361 A1 10/2009 Franco et al.
2010/0114455 A1 5/2010 Karlsson et al.
2011/0311373 A1* 12/2011 Garcia-Lorenzana et al. . 417/53

OTHER PUBLICATIONS

International Search Report Issued Sep. 19, 2011 in PCT/EP11/60468 Filed Jun. 22, 2011.

* cited by examiner

METHOD FOR MONITORING AN SCR SYSTEM

The present application relates to a method for monitoring an SCR system. In particular it relates to a method for detecting whether its injector is clogged.

Legislation on vehicle and heavy goods vehicle emissions stipulates, amongst other things, a reduction in the release of nitrogen oxides $NO_x$ into the atmosphere. One known way to achieve this objective is to use the SCR (Selective Catalytic Reduction) process which enables the reduction of nitrogen oxides by injection of a reducing agent, generally ammonia, into the exhaust line. This ammonia may derive from the thermolytic decomposition of an ammonia precursor solution, whose concentration may be the eutectic concentration. Such an ammonia precursor is generally a urea solution.

With the SCR process, the high levels of $NO_x$ produced in the engine during combustion at optimized efficiency are treated in a catalyst as they exit the engine. This treatment requires the use of the reducing agent at a precise concentration and of extreme quality. The solution is thus accurately metered and injected into the exhaust gas stream where it is hydrolysed before converting the nitrogen oxide ($NO_x$) to nitrogen ($N_2$) and water ($H_2O$).

In order to do this, it is necessary to equip the vehicles with a tank containing an additive solution (generally an aqueous urea solution) and also a device for metering the desired amount of additive and injecting it into the exhaust line. This device is generally an injector and preferably is of "active" type, i.e. it includes the metering function.

U.S. Pat. No. 6,063,350 describes an SCR system that uses an injector controlled by a PWM (Pulse Width Modulation) signal. Such a signal is generally in the form of a square-wave voltage, i.e. a sequence of rectangular electrical pulses having a given duration and amplitude and emitted with a given period. These electrical pulses actuate a coil (solenoid) which moves the needle of the injector to its open position. Generally, the duration of the pulses (and therefore the opening time of the injector) is varied in order to vary the flow injected, hence the name of this type of control (PWM). The advantage of only varying the duration and not the frequency of the pulses lies in the fact of having a linear relationship between the opening time and the amount (flow) injected, hence a greater metering precision. There is an alternative to the aforementioned sequence of rectangular waves, according to which a peak current is first used to open the injector and a holding current is then used throughout the open phase of the injector. Such a type of signal is called PWM with hold. In the remainder of the document, the acronym PWM will very simply be used to denote these two types of signals. Injectors as described above exist with one or more orifices that can be closed off by a common needle valve.

However, the drawback of this type of injector is that the orifice(s) may in the end become clogged. The new Euro-6 standard which will come into effect in 2014 provides that every 30 min, a test must be carried out and that an alarm must be sent if the amount of urea consumed is less than 50% of the amount of urea required by the engine control system for carrying out the pollution control of the exhaust gases.

Hence, some companies active in the development of SCR systems have begun to develop systems that make it possible to carry out such tests.

Thus, for example, applications US 2010/0005871 and US 2010/0071349 describe test methods for an SCR system injector according to which tests, in order to observe whether an injector is clogged, the pump is shut down, the injector is fully opened and it is observed how the pressure changes.

These methods are difficult to implement in practice because the opening of the injector must be synchronous with the shutdown of the pump. Moreover, they involve a disruption of the pollution control process since the pump must be shut down in order to make the diagnosis.

Application US 2010/0114455 describes another test method for an SCR system injector which this time is carried out with the pump running. It consists in modifying the condition (control) of the injector, then in observing how a quantity characteristic of its flow rate (the rotational speed of the engine that drives it for example) changes. In principle, this method could induce a lesser disruption of the pollution control process, but it is not described in sufficient detail in the application in question in order to understand how it would work in practice. Moreover, the application does not provide many details (especially regarding the type of pump in question, regarding the way of carrying out the tests in practice, etc.) or experimental results that make it possible to ensure its effective operation.

The present invention aims to solve these problems by providing a method for monitoring an SCR system injector which is simple, gives good results with an SCR system with a rotary positive-displacement pump and does not disrupt the pollution control process too much.

For this purpose, the present application relates to a method for detecting whether an injector with a valve controlled by a PWM signal of an SCR system is clogged, said system comprising a rotary positive-displacement pump driven by a motor and the pressure of which is controlled by a controller that continuously measures the rotational speed of the motor and the pressure at the outlet of the pump, according to which, during the operation of the SCR system at a given pressure:
  the associated average rotational speed is measured;
  the speed is held at this value;
  the curve of the change in pressure is compared to reference curves stored in a memory and the condition of the injector (clogged or not) is deduced therefrom.

In particular, with a pump that is also controlled by a PWM-type signal, characterized by a duty cycle (or DC), it is sufficient to compare the average pressure level, once this has stabilized at a given DC of the control signal of the pump, with a reference value stored in a memory.

One advantage of this method is that as soon as the speed is held and the control cut, this method is not very sensitive to certain external parameters such as, for example, the temperature, the parameters/characteristics of the controller, etc.

However, one drawback of this method results precisely from the fact that since the control of the pump is blocked during the diagnosis of the injector, the pressure could drop below the value specified by motor vehicle manufacturers. Hence, one variant of the invention makes provision for stopping the diagnosis (and hence, releasing the speed which had been blocked/hold) and restarting the control as soon as the pressure drops below a predetermined threshold value. In practice, this is generally greater than or equal to 4.5 bar in order to guarantee the correct operation of the injector. It is generally less than or equal to 5.5 bar, although exceeding this value does not have serious practical consequences (it is just useless and not economical to generate excessive pressure). Hence, another way of avoiding dropping below a threshold pressure consists, as soon as the diagnosis is initiated, in increasing the pressure, for example to 5.2 or 5.3 bar (this value in fact being characteristic of the DC so that is can also be stored in the memory), in order to compensate for the expected pressure drop. In other words: in this variant, the pressure at which the speed is held is preferably greater than the nominal operating pressure of the pump.

The injector to which the method according to the invention applies comprises at least an orifice, the opening/closure of which is carried out by a valve controlled by a PWM signal as described above. This is generally an electromagnetic or piezoelectric valve. The invention gives good results with injectors having an electromagnetic valve.

The pump to which the invention applies is a rotary positive-displacement pump driven by a motor and the operation of which is controlled by a controller. Preferably, the pump is of the gear pump type. It generally comprises a stator and a rotor and can preferably operate in two opposite rotational directions, one generally corresponding to supplying a feed line with liquid and the other generally corresponding to a purge of the feed line.

Any type of rotary electric motor may be suitable. Preferably, the motor is of the BLDC (brushless direct current) motor type. In this case, the pump is driven by a magnetic coupling between the rotor of the pump and a drive shaft of the motor.

The controller of this pump is a control module (generally comprising a PI(D) regulator and a motor rotational speed controller) and an electric power supply unit which preferably supplies the motor with the power required to rotate it at the desired speed and which enables its direction of rotation to be reversed, where necessary.

Most particularly preferably, an ECM (Electronic Control Module) sends, to the pump controller, a PWM (Pulse Width Modulation) control signal having a duty cycle that varies as a function of the desired operating conditions for the pump and according to which the controller acts on the motor to apply said operating conditions to the pump. This preferred variant is the subject of Application WO 2008/087153 in the name of the Applicant, the subject of which is incorporated by reference in the present application.

As explained previously, the present invention is applied to an SCR system, the purpose of which is to inject a pollution-control liquid into the exhaust gases of an internal combustion engine. Such a system generally comprises at least one tank for storing said liquid and a feed line enabling said liquid to be conveyed to the injector using the pump (placed in this line therefore). One liquid to which the present invention applies particularly well is urea.

The term "urea" is understood to mean any, generally aqueous, solution containing urea. The invention gives good results with eutectic water/urea solutions for which there is a quality standard: for example, according to the standard DIN 70070, in the case of the AdBlue® solution (commercial solution of urea), the urea content is between 31.8% and 33.2% (by weight) (i.e. 32.5+/−0.7 wt %) hence an available amount of ammonia between 18.0% and 18.8%. The invention may also be applied to the urea/ammonium formate mixtures, also in aqueous solution, sold under the trade name Denoxium™ and of which one of the compositions (Denoxium-30) contains an equivalent amount of ammonia to that of the AdBlue® solution. The latter have the advantage of only freezing from −30° C. downwards (as opposed to −11° C.), but have the disadvantages of corrosion problems linked to the possible release of formic acid and a less available market (whereas urea is widely used and readily available even in fields such as agriculture). The present invention is particularly advantageous in the context of eutectic water/urea solutions.

In one variant of the invention, the pump intentionally meters too great an amount of liquid, the excess of which is returned to the tank, for example using a return (or bypass) line equipped with a preloaded valve or a calibrated orifice. When the urea is injected into the exhaust gases of an engine, this variant makes it possible to cool the pump. Alternatively, the return line may start from the injector and it then makes it possible to cool said injector.

In another variant of the invention, the feed line is purged after each use of the pump (just before it is shut down) in order to reduce the starting time of the system and avoid prematurely damaging the lines (as the urea solutions expand under freezing conditions). The purge may be carried out, for example, by reversing the rotational direction of the pump just for the time necessary to convey the liquid contained in the feed line back to the tank.

As regards the return line, if present, it generally has a relatively low volume and therefore, if it is heated, it should not be purged while the pump is stopped. Therefore, to prevent the liquid from going round in circles in the loop determined by the feed line and the return line during the purge when this is carried out by reversing the rotational direction of the pump, it is advantageous to equip the return line with a non-return valve.

According to the invention, the diagnosis of the injector is carried out by holding the rotational speed at a value associated with a given pressure, and by observing the resulting pressure, the controller in any case having to carry out these measurements (of speed and of pressure) as an integral part of the control process (which will be described in greater detail below). The change in the resulting pressure is then compared with equivalent curves stored in a memory. Preferably, in order to have rapid processing of the information, this memory is located in the ECM of the SCR system, which communicates with the ECU as explained above. But it should be noted that this parameter depends on the architecture of the SCR system (which may or may not have a specific ECM).

According to one variant of the invention, the values in the memory are recalculated at a given frequency so as to have a reference that adapts to the change (ageing) of the system.

According to the invention, the controller is connected to a pressure sensor and it compares, in a loop, the pressure setpoint value with the value measured by the sensor and consequently acts on the rotational speed of the motor in order to attempt to stabilize the pressure at the setpoint value. Preferably, this sensor is located before the return (bypass) line, where necessary.

Generally, this is done using a pressure regulator which carries out the comparison between the setpoint pressure and the pressure measured and generates an error signal for the motor's rotational speed controller.

In this variant, the regulator may be of any known type, but it is preferably of PI(D) type (Proportional Integral Derivative, the latter function being optional).

As regards the pressure sensor, it is preferably integrated into the pump, that is to say that it may be attached to the pump by any known attachment means.

In a preferred embodiment of the invention, after an "injector clogged" diagnosis has been performed, the result thereof is validated. This can be done easily by checking if the pressure and speed are in the normal range of operation. It is namely so that for instance, in case of loss of fluid, when in pressure regulation mode, the pump speed will increase until saturation (max. speed), which phenomenon can easily be detected. Also, in the first injection cycles after priming the pump, speed peaks can be observed, which should be disregarded because not linked to an "injector clogged" situation but to the fact that air may still be present in the system.

It should be noted that all the variants described above may be used separately or in combination.

Figure 2:
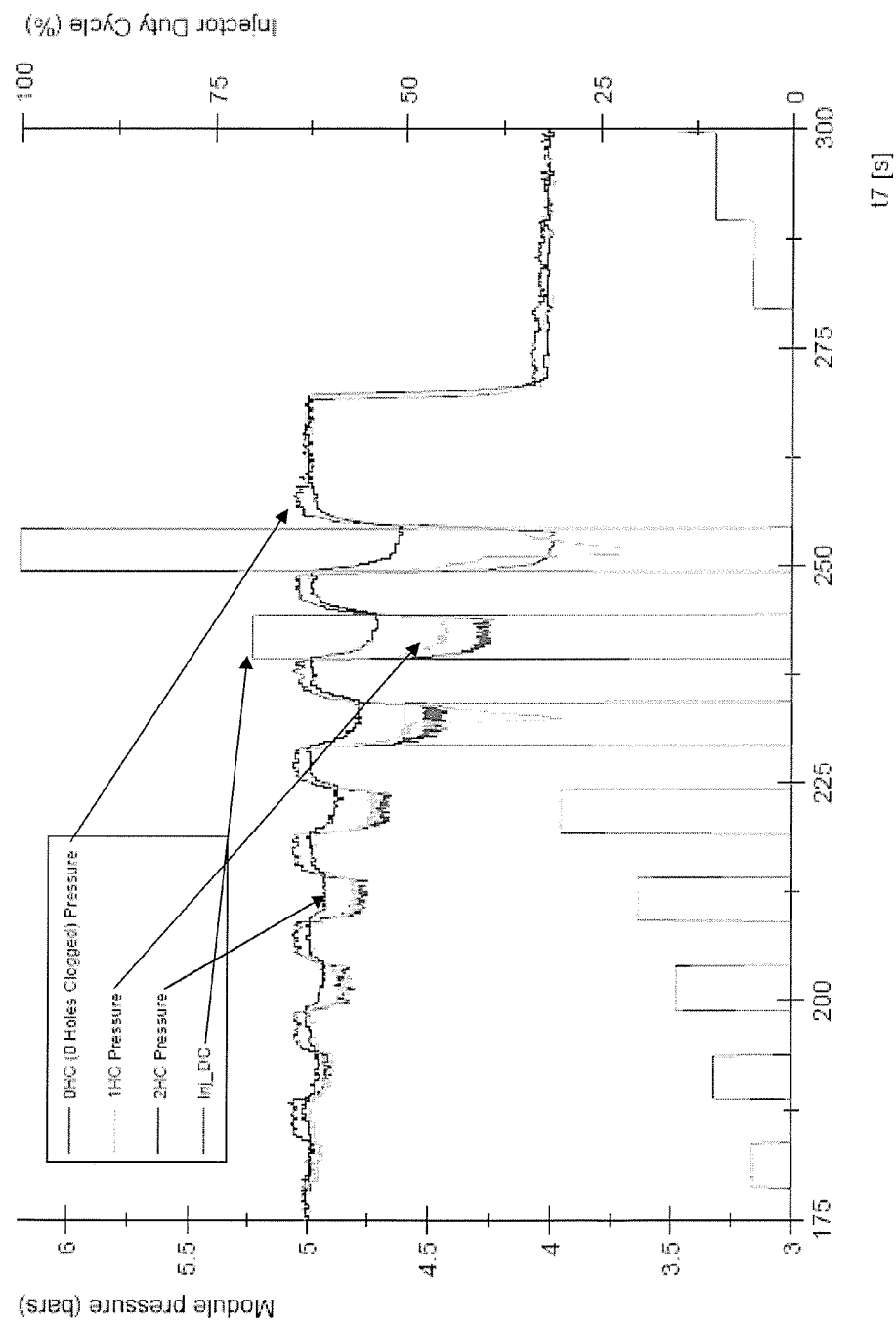

The present invention is illustrated, in a non limitative way, by the appended FIGS. 1 and 2.

FIG. 1 depicts an SCR system to which the present invention may be applied;

FIG. 2 gives the result of measurements illustrating the fluctuations and changes in pressure/speed that are at the key of the invention.

FIG. 1 illustrates an SCR system to which the present invention may be applied and which comprises the following components:
1: urea tank
2: gauge (level sensor)
3: heating element
4: filter
5: temperature sensor
6: current sensor for the heating element
7: pump
8: speed sensor
9: heating filament for the lines and pump heating cartridge
10: pressure sensor
11: current sensor for the line heater
12: injector
13: non-return valve that prevents the liquid from going round in circles (in the loop created by the feed line and that for return to the tank) during the purge (when the pump rotates in reverse);
14: calibrated orifice (restriction)—used to set the flow rate and to add resistance in order to increase the pressure (by increasing pressure drops in the return line)
15: (BLDC) motor for driving the pump;
16: non-return valve that enables the pressure at the pump outlet to be regulated.

It is worth noting that with such a system, an additional cause of error in the "injector clogged" diagnosis (than those reported above, namely: fluid loss and priming conditions) exists, owed to the fact that the non-return valve (13) can be blocked and unblocked, which phenomenon again can be detected easily because the pump speed will be below its normal value when the valve is clogged. If this unblocking occurs during a diagnosis, the speed will be higher after said diagnosis than during it, so that again, the phenomenon can be detected. All this again shows the advantage of dynamically measuring the pressure/speed and analysing/comparing the registered data with data stored in a memory, as in the present invention.

FIG. 2 illustrates the drop in pressure associated with progressive openings (increasing duty cycle) of the injector for a constant speed corresponding to that measured during a constant pressure regulation at 5 bar. In this graph, x-axis shows the time (in s) and the y-axes show, respectively, the duty cycle (Injector Duty Cycle (%) or DC, smooth square peaks) and the pressure drops (Module pressure (bar), jagged peaks) recorded during a test campaign on a system similar to that illustrated in FIG. 1.

These tests proceeded as follows:
the system was stabilized by regulating the pressure at 5 bar;
the injector was closed and the speed was measured;
this speed was then maintained and the injector was successively opened at 5, 10, 15, 20, 30, 50, 70 and 100% of DC and at a frequency of 3.3 Hz, this being over the times indicated in FIG. 2 (5 s) and while closing the injector for a given time (also seen in the figure: 5 s also) between each different opening test of the injector.

The differences highlighted above between a clogged injector and an open injector can be seen in FIG. 2. Indeed, it is possible to see therein that depending on the degree of obstruction of the injector, the stabilized pressure values (average pressures) are different for a given DC.

It is true that for a DC of less than 50%, it is not possible to distinguish between one hole clogged or zero holes clogged but the method according to the invention nevertheless makes it possible to clearly demonstrate when 2 holes out of 3 are clogged and therefore to satisfy the aforementioned standard.

The invention claimed is:

1. A method for detecting whether an injector with a valve controlled by a PWM signal of an SCR system is clogged, the SCR system including a rotary positive-displacement pump driven by a motor and pressure of which is controlled by a controller that continuously measures rotational speed of the motor and pressure at an outlet of the pump, the method comprising, during operation of the SCR system at a given pressure:
measuring an associated average rotational speed;
holding the speed at the measured value;
comparing a curve of change in pressure to reference curves stored in a memory and deducing a condition of the injector therefrom,
wherein the control of the pump is blocked during the diagnosis of the injector.

2. A method according to claim 1, wherein a pressure at which the speed is held is greater than a nominal operating pressure of the pump.

3. A method according to claim 1, wherein the valve of the injector is an electromagnetic valve.

4. A method according to claim 1, wherein the pump is a gear pump.

5. A method according to claim 1, wherein a memory is present in an ECM specific to the SCR system.

6. A method according to claim 1, wherein the controller is connected to a pressure sensor and the controller compares, in a loop, a pressure setpoint value with the value measured by the sensor and consequently acts on the rotational speed of the motor to attempt to stabilize the pressure at the setpoint value.

7. A method according to claim 6, wherein the pressure sensor is integrated into the pump.

8. A method for detecting whether an injector with a valve controlled by a PWM signal of an SCR system is clogged, the SCR system including a rotary positive-displacement pump driven by a motor and pressure of which is controlled by a controller that continuously measures rotational speed of the motor and pressure at an outlet of the pump, the method comprising, during operation of the SCR system at a given pressure:
measuring an associated average rotational speed;
holding the speed at the measured value;
comparing a curve of change in pressure to reference curves stored in a memory and deducing a condition of the injector therefrom,
wherein the pump is also controlled by a PWM-type signal, characterized by a duty cycle (DC), and according to which average pressure level at a given DC of a control signal of the pump is compared with a reference value stored in the memory.

9. A method for detecting whether an injector with a valve controlled by a PWM signal of an SCR system is clogged, the SCR system including a rotary positive-displacement pump driven by a motor and pressure of which is controlled by a controller that continuously measures rotational speed of the motor and pressure at an outlet of the pump, the method comprising, during operation of the SCR system at a given pressure:
measuring an associated average rotational speed;
holding the speed at the measured value;

comparing a curve of change in pressure to reference curves stored in a memory and deducing a condition of the injector therefrom, wherein the speed is released and a control is restarted as soon as the pressure drops below a threshold value.

10. A method for detecting whether an injector with a valve controlled by a PWM signal of an SCR system is clogged, the SCR system including a rotary positive-displacement pump driven by a motor and pressure of which is controlled by a controller that continuously measures rotational speed of the motor and pressure at an outlet of the pump, the method comprising, during operation of the SCR system at a given pressure:

measuring an associated average rotational speed;
holding the speed at the measured value;
comparing a curve of change in pressure to reference curves stored in a memory and deducing a condition of the injector therefrom,
wherein a memory is present in an ECM specific to the SCR system, and
wherein values in the memory are recalculated at a given frequency so as to have a reference that adapts to a change or ageing of the system.

* * * * *